Jan. 6, 1953 T. M. JOLLEY 2,624,150
FISHHOOK
Filed Feb. 14, 1950
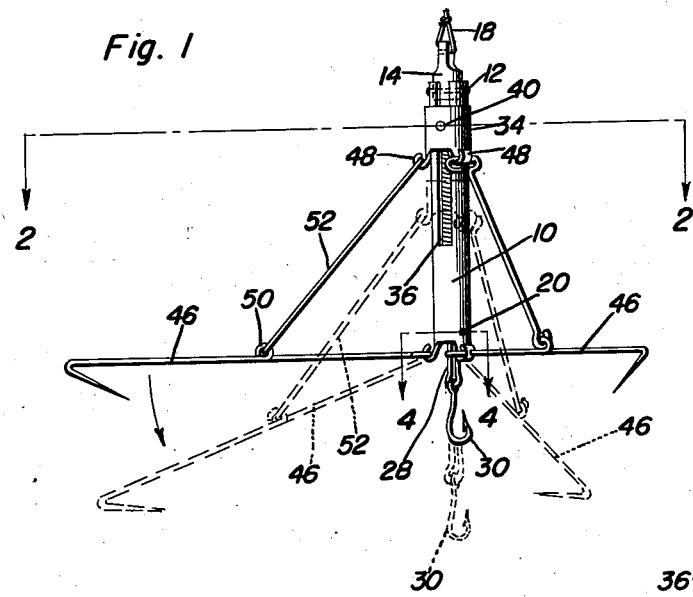
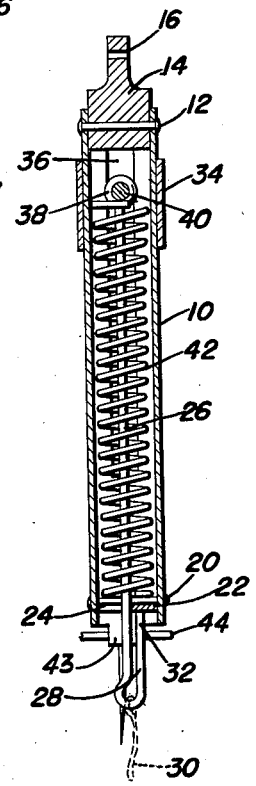
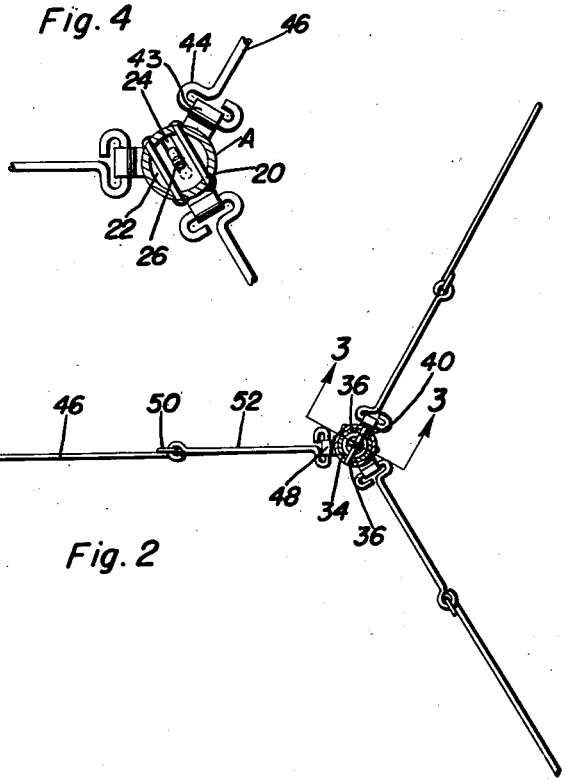
Thomas M. Jolley
INVENTOR.

UNITED STATES PATENT OFFICE 2,624,150

FISHHOOK

Thomas M. Jolley, Oskaloosa, Iowa

Application February 14, 1950, Serial No. 144,175

5 Claims. (Cl. 43—89)

This invention relates to a fishhook of novel construction and design, the primary object of which is to make it difficult, if not impossible, for a fish to escape from the bait hook.

An important object of this invention is to provide a fishhook consisting of a bait hook which, when gripped by a fish, will be pulled downwardly to simultaneously actuate a pair of elongated hooks which will move inwardly to close about and grip the body portion of the fish. Frequently, a soft-mouthed fish will be able to tear itself loose from a bait hook. Accordingly, the present device is designed to prevent the fish from tearing loose from the bait hook.

A further object of this invention is to provide a device which is relatively simple in design and construction, cheap to manufacture in large quantities, easy to assemble upon a fishing line, and very efficient for its intended purpose.

Yet another object of the invention is to provide a fishhook comprising a vertical tubular shank, means securing the upper end of said shank to a fishing line, a rod slidable in said shank, a bait hook on the lower end of said rod, auxiliary fish body-engaging hooks pivoted to the lower end of said shank, links terminally pivoted to a collar and to said auxiliary hooks intermediate the ends of the latter, means securing said collar to said rod for sliding movement therewith, and resilient means urging said rod and collar upwardly in said shank.

These, together with various ancillary objects and features of the invention which will later become apparent as the following description proceeds, are attained by the device, a preferred embodiment of which has been illustrated, by way of example only, in the accompanying drawings, wherein:

Figure 1 is a side elevational view of the present device;

Figure 2 is a sectional view taken substantially on the plane of section line 2—2 of Figure 1;

Figure 3 is a sectional view taken substantially on the plane of section line 3—3 of Figure 2;

Figure 4 is a sectional view taken substantially on the plane of section line 4—4 of Figure 1.

Specific reference will now be made to the drawings. In the several views, in the accompanying drawings and in the following specification, similar reference characters indicate corresponding elements throughout.

The present device may be fabricated of suitable light-weight metals and consists of a tubular shank 10, to the upper end of which is secured, as by a diametrically extending pin 12, a block or bearing member 14 having an aperture 16 therein for receiving the loop of a fishing line 18. At its lower end, the shank is provided with a pair of diametrical pins 20 and a press-fit plate 22 having a slot 24 therein for a purpose later to be described.

Slidable in the tubular shank is a rod 26 having an upturned extension 28 at its bottom end providing an eye for receiving a conventional bait hook 30. The extension 28 has a free end 32 which is adapted to abut the plate 22 to limit the upward movement of the rod within the tubular shank.

Slidable on the tubular shank is a collar 34 and provided in the wall of the shank is a pair of slots 36. The upper end of the rod 26 is provided with an eye 38 and extending through this eye and through the slots 36 and secured to the slidable collar 34 is a double-headed or peaned pin 40. A coiled spring 42 is disposed within the tubular shank and wound about the rod 26 and is interposed between the pins 20 and 40, the spring normally urges the rod upwardly in the shank as shown clearly in Figure 3. Extending radially from the bottom end of the tubular shank is a plurality of sleeves 43 for pivotally securing, as at 44, a plurality of body-engaging, elongated hooks 46.

Radially extending from the bottom edge of the collar 34 is a plurality of sleeves 48. Intermediate the ends of the body-engaging hooks 46 are provided eye members 50 and terminally pivoted to these eye members and to the sleeves 48 carried by the collar 34 are elongated link rods 52.

In use, the line 18 is secured to the tubular shank in a manner which will be readily understood with reference to the drawings, and bait is secured upon the central or bait hook 30. As the fish bites on the bait and engages the hook 30, the rod 26 is pulled downwardly against the action of the coil spring 42, the collar 34 riding downwardly on the tubular shank and the body-engaging hooks 46 moving into a closed position to grip the body portion of the fish as shown clearly in dotted lines in Figure 1. Release of the hook 30 will cause the rod 26 to move upwardly in the shank, the upward movement being limited by contact of the free end 32 of the extension 28 with the plate 22 at the bottom of the shank. The slot 24 in the plate 22 assists in the assembly of the rod within the tubular shank and the elongated slots 36 in the shank serve as a guide for the pin 40, the collar 34 and the rod 26, as will be readily understood.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A fishhook comprising an elongated tubular body having a pair of longitudinal slots therein, a rod slidable in said body and extending beyond one end thereof, a bait hook secured to the extending portion of the rod, a collar slidable upon the body, a pin having its ends secured to said collar and extending through said body and slidable in said slots and having its mid-portion engaged with said rod, auxiliary fish hooks pivoted to the end of the body through which said rod extends, links terminally pivoted to said collar and to the auxiliary hooks intermediate their ends, resilient means in said body engaging said pin and urging said rod inwardly of said body and urging said auxiliary hooks into a separated position, means retaining said resilient means in said body and constituting an abutment for said resilient means.

2. The combination of claim 1 wherein said last means includes a pair of spaced parallel pins disposed in a common plane and extending transversely of the body adjacent the end through which the rod extends, said rod extending between said parallel pins.

3. The combination of claim 1 wherein said last means includes a pair of spaced parallel pins disposed in a common plane and extending transversely of the body adjacent the end through which the rod extends, said rod extending between said parallel pins, a plate frictionally retained in said last-mentioned end of the body and abutting said parallel pins, said rod having its extending end turned back upon itself and engaging said plate when said rod is retained in its retracted position by the resilient means.

4. The combination of claim 1 wherein said last means includes a pair of spaced parallel pins disposed in a common plane and extending transversely of the body adjacent the end through which the rod extends, said rod extending between said parallel pins, a plate frictionally retained in said last-mentioned end of the body and abutting said parallel pins, said rod having its extending end turned back upon itself and engaging said plate when said rod is retained in its retracted position by the resilient means, said plate having a slot extending from its center to its periphery, said rod being disposed in said slot.

5. The combination of claim 1 wherein said last means includes a pair of spaced parallel pins disposed in a common plane and extending transversely of the body adjacent the end through which the rod extends, said rod extending between said parallel pins, said resilient means comprising a compression coil spring surrounding said rod and abutting said parallel pins.

THOMAS M. JOLLEY.

REFERENCES CITED

The following references are of record in the file of this patent:

UNITED STATES PATENTS

| Number | Name | Date |
|---|---|---|
| 95,755 | Angers | Oct. 12, 1869 |
| 223,194 | Vache | Dec. 30, 1879 |
| 911,781 | Timmons | Feb. 9, 1909 |
| 1,010,605 | Emel | Dec. 5, 1911 |
| 1,387,735 | Payne | Aug. 16, 1921 |